United States Patent
Kepler et al.

(10) Patent No.: US 12,104,881 B2
(45) Date of Patent: Oct. 1, 2024

(54) COUNTERMEASURE SYSTEM HAVING A CONFIRMATION DEVICE AND METHOD THEREOF

(71) Applicant: BAE SYSTEMS INFORMATION AND ELECTRONIC SYSTEMS INTEGRATION INC., Nashua, NH (US)

(72) Inventors: Matthew F. Kepler, Austin, TX (US); Will R. Grigsby, Austin, TX (US); Eric C. Hoenes, Austin, TX (US); Somit S. Mathur, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 365 days.

(21) Appl. No.: 17/838,601

(22) Filed: Jun. 13, 2022

(65) Prior Publication Data
US 2023/0400282 A1 Dec. 14, 2023

(51) Int. Cl.
*F41H 11/02* (2006.01)
*G01S 7/41* (2006.01)

(52) U.S. Cl.
CPC .............. *F41H 11/02* (2013.01); *G01S 7/415* (2013.01)

(58) Field of Classification Search
CPC ........... F41H 11/02; G01S 7/415; G01S 13/88
See application file for complete search history.

(56) References Cited

U.S. PATENT DOCUMENTS

| | | | |
|---|---|---|---|
| 4,179,088 A | 12/1979 | French | |
| 7,916,065 B1 | 3/2011 | Mintz et al. | |
| 8,258,998 B2 * | 9/2012 | Factor | G01S 13/867 342/13 |
| 8,464,949 B2 | 6/2013 | Namey et al. | |
| 9,632,168 B2 | 4/2017 | Moraites et al. | |
| 11,181,346 B1 | 11/2021 | Barfoot et al. | |
| 2005/0150371 A1 | 7/2005 | Rickard | |
| 2008/0191926 A1 * | 8/2008 | Benayahu | H04N 7/18 342/55 |

(Continued)

FOREIGN PATENT DOCUMENTS

| | | |
|---|---|---|
| GB | 2342983 | 4/2000 |
| GB | 2354312 | 3/2001 |

(Continued)

OTHER PUBLICATIONS

Bae Systems Inc., Integrated Vehicle Protection System, 2020.

*Primary Examiner* — Olumide Ajibade Akonai
*Assistant Examiner* — Yonghong Li
(74) *Attorney, Agent, or Firm* — Sand, Sebolt & Wernow LPA

(57) ABSTRACT

A soft-kill countermeasure system utilizing a confirmation device, which may be radar, to enhance existing countermeasures, and enable new countermeasures to be utilized to combat the ever evolving and increasing sophistication of threats. The threat defeat confirmation may allow for rapid or immediate redirection of the countermeasure system to address additional simultaneous threats. The confirmation device can be mounted on a gimbal head or above a gimbal to take advantage of slewing movement to direct the confirmation signal towards the threat.

20 Claims, 11 Drawing Sheets

(56) References Cited

U.S. PATENT DOCUMENTS

| | | | |
|---|---|---|---|
| 2008/0291075 A1* | 11/2008 | Rapanotti | G01S 13/867 42/105 |
| 2009/0084253 A1 | 4/2009 | Bellino et al. | |
| 2009/0158954 A1 | 6/2009 | Wardecki et al. | |
| 2012/0055990 A1 | 3/2012 | Weiss et al. | |
| 2012/0217301 A1* | 8/2012 | Namey | F41G 3/04 235/411 |
| 2014/0102288 A1 | 4/2014 | Yeshurun et al. | |
| 2014/0368814 A1* | 12/2014 | Krupkin | F41G 7/224 356/139.08 |
| 2022/0207974 A1* | 6/2022 | Illner | G06V 10/25 |

FOREIGN PATENT DOCUMENTS

| | | |
|---|---|---|
| GB | 2519785 | 5/2015 |
| WO | 2014129961 | 8/2014 |

\* cited by examiner

COUNTERMEASURE SYSTEM HAVING A CONFIRMATION DEVICE AND METHOD THEREOF

TECHNICAL FIELD

The present disclosure relates generally to the field of electronic warfare countermeasures. More particularly, the present disclosure relates to electronic warfare countermeasures utilizing a confirmation device.

BACKGROUND

Electronic warfare (EW) is one of many facets of modern military operations. Specifically, EW is the observation and use of the electromagnetic spectrum, including actions to detect, evade, attack, or impede enemy vehicles or installations that likewise broadcast or operate within the electromagnetic spectrum. The general purpose of EW is to utilize the electromagnetic spectrum to obtain an advantage for operations in neutral or contested environments, and for defense in friendly environments. EW may be applied from multiple platforms ranging across all frequencies of the electromagnetic spectrum and may be utilized in air, sea, land, and/or space operations by both manned and unmanned systems.

As it relates to threats or more particularly to threat avoidance, EW is particularly useful in or when integrated with both hard-kill and soft-kill countermeasure systems.

Modern military vehicles, including tanks, personnel carriers, trucks, aircraft, and/or ships, face ever increasing threats as they operate in hostile areas. Commonly, these threats include guided munitions, such as a missile or other warhead carrying projectile, which are launched from small, highly portable launch platforms. These guided projectiles are becoming increasingly difficult to counter as they evolve to utilize more sophisticated guidance and tracking systems.

Currently, standard countermeasures typically fall into one of two categories, namely, hard-kill countermeasures and soft-kill countermeasures. Hard-kill countermeasures include any defensive action that fires or otherwise launches a counter projectile towards the incoming threat in an effort to physically destroy the threat. This may include countering the incoming threat with a similar counter action such as firing a missile at an incoming missile. As hard-kill countermeasures typically require a direct impact or very close proximity to the incoming threat, these systems tend to utilize a tracking radar to both locate and track the incoming threat as it moves toward its target. The use of this tracking radar then may allow the hard-kill countermeasure to be directed to the appropriate spot to intercept threat.

Soft-kill countermeasures, on the other hand, utilize the electromagnetic spectrum and/or electromagnetic energy to impair the incoming threat's ability to accurately reach its target. Current soft-kill countermeasures may include actions such as signal jamming, deploying flares, deploying chaff, or other such measures to confuse the guidance system of the incoming threat to further direct it away from its target or allow the target vehicle an opportunity to evade the incoming threat. Soft-kill countermeasures typically do not include any form of tracking systems, instead relying on optical sensors which detect a missile launch and provide the threat's original launch location. In some instances, this information allows the soft-kill countermeasure to counter and redirect the incoming threat by affecting the guidance system co-located with the missile or missile launcher. Typically, these soft-kill countermeasures require a period of time to pass between threat detection and effective threat avoidance. Further, with soft-kill countermeasures, it is often not confirmed whether or not the threat was successfully avoided until an impact does or does not occur. Put another way, for example, a soft-kill countermeasure opposing an incoming guided missile may not provide a confirmation that the threat has been defeated or successfully avoided until the elapsed time after the missile launch has exceeded the maximum flight time of the missile. This may leave target vehicles vulnerable to simultaneous threats from various directions, as well as may result in an unsuccessful avoidance attempt that will not be determined until the threat impacts its target.

Further, as these threats evolve in their ability to be fired or launched from easily concealed and portable platforms, the time in which the target has to respond and counteract these threats is decreasing. Accordingly, soft-kill countermeasures are becoming less effective, particularly in areas where multiple threats may be simultaneously present.

As an example, in defending vehicles from anti-tank guided missile (ATGM) threats, amongst other launched threats, the sequence of events is as follows: an optical sensor detects the threat, and laser countermeasures (or other soft kill countermeasures) are deployed against the threat to cause it to crash prior to reaching the target vehicle or divert it away from the target vehicle. However, currently, there is no way to determine if the threat cue is a real threat, and secondly, if engaged against a threat, when the threat is defeated.

SUMMARY

Improvements in threat confirmation are desired, especially on platforms with multiple assets deployed. The present disclosure addresses these and other issues by providing a soft-kill countermeasure system utilizing a confirmation device to enhance existing countermeasures and enable improved countermeasures to be utilized to combat the ever evolving and increasing sophistication of threats. The use of confirmation may further allow for immediate threat defeat confirmation which may allow for rapid or immediate redirection of the countermeasure system to address additional simultaneous threats. One particular example to address the issues to determine whether the threat cue is a real threat, and secondly, if engaged against a threat, when the threat is defeated, provides a confirmation sensor or confirmation device that verifies threat cues. The confirmation sensor or confirmation device confirms that an ATGM or other launched threat is incoming. Therefore the confirmation sensor or confirmation device can "confirm" a launch and reduce false alarm rates (FAR) of the system. Secondly, when the electro-optical/infrared soft-kill counter measures are engaged against a confirmed threat, the confirmation sensor or confirmation device described herein can be used to determine when the threat is defeated. This allows for an improved mission timeline, and frees the system from the threat engagement to possibly interrogate other threat cues and/or engage additional incoming threats in a compressed timeline. This should lead to enhanced vehicle survivability statistics.

In one exemplary aspect, an embodiment of the present disclosure may provide a soft-kill countermeasure system comprising: a cueing sensor operable to detect a launch of a projectile; a confirmation device having one or more antenna elements operable to locate and track the projectile; a processor in operative communication with the cueing sensor and confirmation device operable to determine a category and type of threat posed by the projectile from data collected by the confirmation device; a beam generator operable to generate a beam of electromagnetic energy configured to counter the threat posed by the projectile; wherein the beam generator directs the beam to a spot on a ground surface away from a ground target to divert the projectile or directs the beam at optics on the projectile to disrupt its guidance systems; and a confirmation device in operative communication with the processor operable to determine whether the threat cue is a real threat, and, if it is determined that the threat cue is the real threat then determine when the real threat is defeated. This exemplary embodiment or another exemplary embodiment may further provide a housing including a top end and a bottom end; a gimbal coupled to the housing; beam optics carried by the housing positioned above the gimbal; and wherein the confirmation device is positioned above the optical gimbal. The location of the confirmation radar or device on the gimbal itself may be considered advantageous because the confirmation device moves with the optical gimbal, reducing the number of transmitter elements required to cover 360 degree field of regard. Generally the number of radar elements can be reduced to a single radar array.

In another aspect, an exemplary embodiment of the present disclosure may provide a soft-kill countermeasure system comprising: a platform; at least one cueing sensor on the platform operable to detect a launch or movement of a projectile; a processor in operative communication with the at least one cueing sensor; a soft-kill countermeasure housing including a top end and a bottom end, wherein the top end is above the bottom end, and a gimbal coupled to the housing; a countermeasure transmitted outward from the soft-kill countermeasure housing; and a confirmation device positioned adjacent the top end of the soft-kill countermeasure housing above the gimbal, and the confirmation device is in operative communication with the processor to track and locate the projectile and to determine a category and type of threat posed by the projectile from data collected by the confirmation device, and the processor operable to generate a threat cue and determine whether the threat cue is a real threat or a false alarm, and if it is determined that the threat cue is the real threat, then the confirmation device determines when the real threat is defeated by the countermeasure. This exemplary embodiment or another exemplary embodiment may further provide beam optics carried by the housing positioned above the gimbal; and wherein the confirmation device is positioned above the gimbal. This exemplary embodiment or another exemplary embodiment may further provide a gimbal head located above the gimbal, the gimbal head including a first surface having a first area; and the confirmation device including a second surface, wherein the second surface is coupled to the first surface of the gimbal head and adapted to move in unison with the gimbal head about the gimbal.

This exemplary embodiment or another exemplary embodiment may further provide a signal generated by the confirmation device in response to the cueing sensor viewing the projectile; and confirmation logic in operative communication with the processor to determine that the real threat has been defeated. This exemplary embodiment or another exemplary embodiment may further provide a second signal generated by the confirmation device in response to confirmation device having determined the projectile has been defeated; and wherein the confirmation logic causes cause the confirmation device to cease radiation emission in response to the second signal. This exemplary embodiment or another exemplary embodiment may further provide wherein the signal is a confirmation signal generated for a period of time in a range from about 10 ms to about 100 ms. This exemplary embodiment or another exemplary embodiment may further provide wherein the signal is a confirmation signal generated in a Ku Band ranging from about 12 GHz to about 18 Ghz. This exemplary embodiment or another exemplary embodiment may further provide that the confirmation signal is generated in a Ka Band ranging from about 26 GHz to about 40 GHz.

This exemplary embodiment or another exemplary embodiment may further provide a signal generated by the confirmation device in response to the cueing sensor having detected a launch or movement of the projectile; and confirmation logic in operative communication with the processor to direct the confirmation device to track the projectile. This exemplary embodiment or another exemplary embodiment may further provide the signal is a tracking signal that is continuously generated while the projectile is tracked.

In yet another aspect, another exemplary embodiment of the present disclosure may provide a method of deploying a soft-kill countermeasure comprising: providing a soft-kill countermeasure housing carried by a platform, the housing having a gimbal carrying a gimbal head; detecting an object via at least one cueing sensor; slewing a confirmation device in unison with the gimbal head about the gimbal, wherein the confirmation device is mounted on the gimbal head and located above the gimbal; tracking a position of the object via the confirmation device; communicating the position of the object to a processor; deploying a soft-kill countermeasure from the housing; monitoring, via the confirmation device, the object in response to the countermeasure having been deployed; and determining, via the confirmation device or the processor, whether the object has been defeated by the countermeasure.

This exemplary embodiment or another exemplary embodiment may further provide generating, via the confirmation device, a signal in response to the cueing sensor having viewed the object; receiving the signal in confirmation logic in operative communication with the processor; and determining, via the confirmation logic or the processor, that the object has been defeated by the countermeasure.

This exemplary embodiment or another exemplary embodiment may further provide communicating at least one of the elevation, velocity, flight pattern, spin rate, control surfaces, cross-section, and size of the object to the processor; determining, via the processor, a threat cue representative of an object type according to the at least one of the elevation, velocity, flight pattern, spin rate, control surfaces, cross-section, and size of the threat; determining, via the processor, a chosen countermeasure to be deployed according to the threat type and position of the object; evaluating the countermeasure for effectiveness via the confirmation device; and deploying a different second countermeasure if the countermeasure is determined to be ineffective.

This exemplary embodiment or another exemplary embodiment may further provide wherein the signal is a confirmation signal generated for a period of time in a range from about 10 ms to about 100 ms. This exemplary embodiment or another exemplary embodiment may further provide generating the signal in one of (i) a Ku Band ranging from about 12 GHz to about 18 GHz and (ii) a Ka Band ranging from about 26 GHz to about 40 GHz. This exemplary embodiment or another exemplary embodiment may further provide directing or instructing the confirmation device to cease radiation emission in response to the determination that the object has been defeated.

In yet another aspect, another exemplary embodiment of the present disclosure may provide a soft-kill countermeasure assembly comprising: a housing having a top end and a bottom end, wherein the top end is above the bottom end; a gimbal coupled to the housing; a gimbal head coupled to the gimbal to rotate 360° about a central axis that extends centrally through the gimbal, the gimbal head included an upwardly facing top surface defining a first surface area; a confirmation device mounted to the gimbal head, wherein the confirmation device rotates in unison with the gimbal head, and the confirmation device includes a downwardly facing bottom surface defining a second surface area, and the second surface area is less than or equal to the first surface area; and beam optics in the gimbal head that rotate in unison with the gimbal head.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
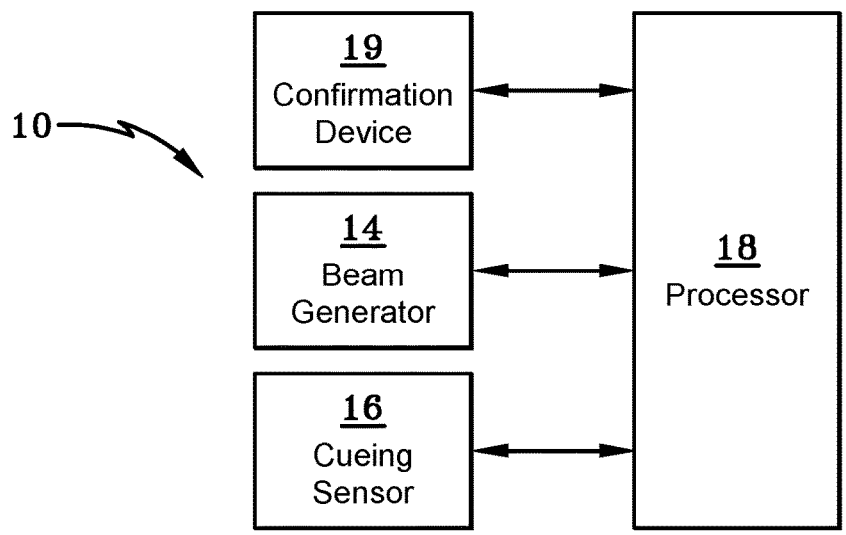
FIG. 1 is a schematic view of an exemplary countermeasure system of the present disclosure.
Figure 2:
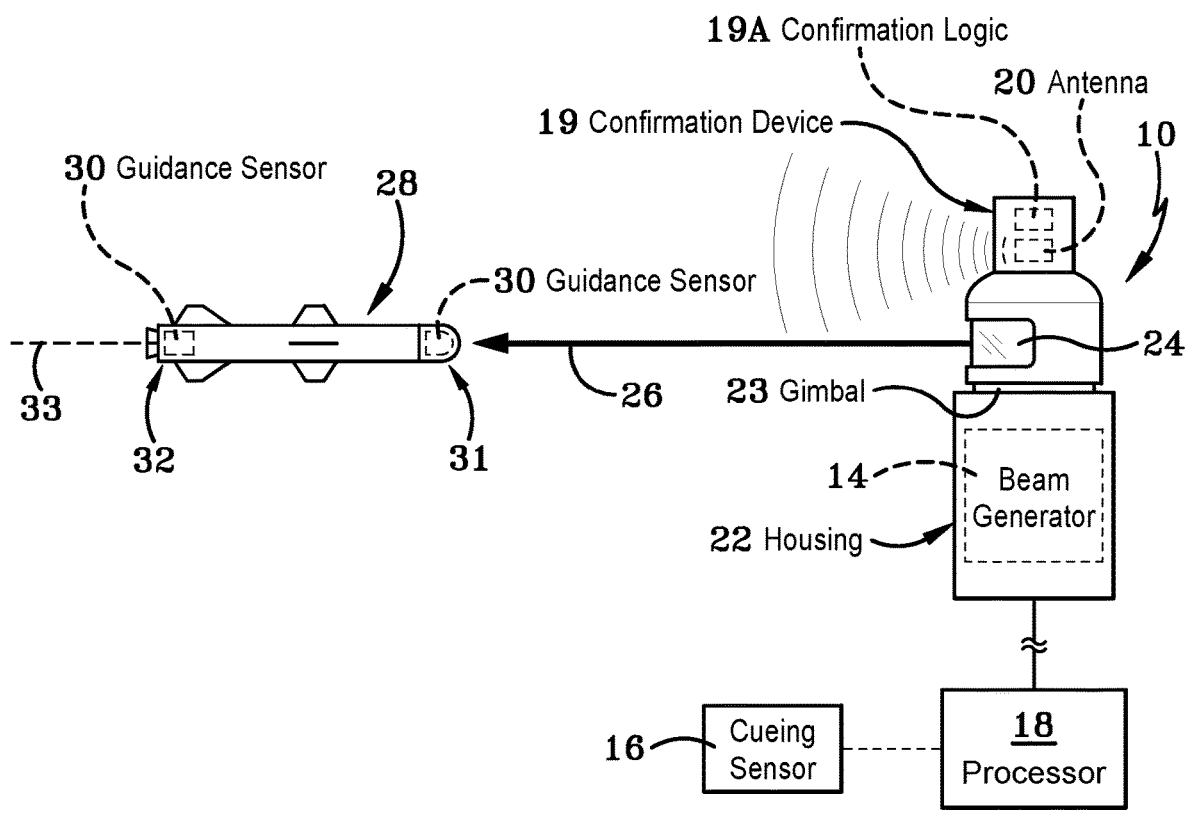
FIG. 2 is an operational view of an exemplary countermeasure system of the present disclosure.

With reference to FIGS. 1 and 2, an enhanced soft-kill countermeasure system utilizing confirmation device or confirmation radar is shown and generally indicated as countermeasure system 10. Countermeasure system 10 may include a beam generator 14, a cueing sensor 16, a processor 18, and a confirmation device 19 (which may also be referred to as a confirmation sensor or confirmation radar). These countermeasure system 10 components, namely, beam generator 14, cueing sensor 16, processor 18, and/or confirmation device 19, may generally be referred to herein as assets. Therefore, it will be understood that the term assets, as used herein, may refer to any or all of these components unless specifically stated otherwise. Countermeasure system 10 may have a housing generally indicated as 22 which may contain some of the countermeasure system 10 assets therein. For example, housing 22, may contain the beam generator 14, cueing sensor 16 and/or processor 18 therein. However, as will be described herein, the confirmation device 19 is positioned atop the housing 22 in one embodiment. The housing 22 may be any suitable size or shape as dictated by the desired implementation and may be constructed of any suitable material, including but not limited to metals, plastics, resins, or similar materials, or any suitable combination of materials. According to another aspect, housing 22 may be omitted. According to yet another aspect, the assets and components of countermeasure system 10 may be carried within, on, or by an associated platform or vehicle, such as vehicle 21 as discussed further herein. According to this aspect, the assets of countermeasure system 10 may be internal to the vehicle 21 and/or housing 22 may be formed as part of vehicle 21. One exemplary countermeasure system that includes housing 22 is commercially available for sale by BAE Systems Inc. and known as the "Terra RAVEN". Thus, the present disclosure is an improvement to housing 22, such as the Terra RAVEN housing with the inclusion or addition of the confirmation device 19.

Beam generator 14 may be any suitable beam generator operable to produce a beam of electromagnetic energy across multiple wavelengths of the electromagnetic spectrum. For example, beam generator 14 may be a laser generator operable to generate laser beams (such as beam 26 discussed below) of varying wavelengths and/or colors. Beam generator 14 may be a part of or may further include a beam director assembly (BDA) (not shown) which may include additional optical components 24, such as lens, mirrors, collimators, divergers, or any other suitable optical component 24 operable to allow a beam 26 generated from the beam generator 14 to be directed, projected, and/or, moved to a desired location(s), as discussed further herein.

According to one aspect, beam generator 14 may be movably or rotationally mounted within or to housing 22 such that beam 26 may be projected from beam generator 14 in any direction or position relative to the beam generator 14 and/or the countermeasure system 10. According to one aspect, beam generator 14 may be gimbal mounted to allow 360° rotation around the azimuth as well as across a suitable range of elevation movements to allow a beam 26 to be projected in any direction relative to countermeasure system 10.

Beam 26 may be any suitable beam operable to perform the desired functions as discussed further herein. For example, according to one implementation, beam 26 may be generated by a semiconductor and may be a diode laser, a solid state laser, distributed feedback laser, gas laser, or chemical laser. According to another aspect, beam generator 14 may include multiple lasers, each emitting a different wavelength, which may be combined into a single beam 26. Beam generator 14 and beam 26 may further be variable, depending upon the desired implementation and the particular needs of countermeasure system 10 to counter a threat 28 as discussed further herein. Accordingly, it will be understood and contemplated that beam generator 14 and beam 26 as used herein may be any suitable beam generator 14 and beam 26 combination according to the specific objectives of the implementation thereof.

Cueing sensor 16 may be an optical sensor which is operable across multiple electromagnetic wavelengths of light, including ultraviolet, visible, infrared, and the like. Cueing sensor 16 may be a camera, focal plane array, or any other suitable visual or optical sensor that may be operable to detect the launch of a threat 28 against a vehicle 21 carrying countermeasure system 10 as discussed further herein. According to another aspect, cueing sensor 16 may have and/or utilize more than one of these visual or optical sensors. According to another aspect, cueing sensor 16 may include additional components or sensors, such as a laser warning receiver, a radio frequency (RF) receiver, or other similar sensors. Cueing sensor 16 may generate a signal in response to the cueing sensor 16 having detected the launch of the projectile 28, or more generally any object.

Cueing sensor 16 can be or may include at least one passive sensor. One exemplary passive cueing sensor is an optical sensor mounted on the platform or vehicle 21. Cueing sensor 16 is configured to observe scenes remote from the platform or vehicle 21, such as, for example, a geographic landscape within its field of view (FOV). In one example, cueing sensor 16 is an image sensor or imager. Further, at least one cueing sensor 16 is embodied as an imager, the imager may be any imager capable of imaging terrain, such as, for example, a visible light imager, infrared (IR), a near-infrared imager, a mid-infrared imager, a far-infrared imager, or any other suitable imager. In one example, the imager has a frame rate of at least 100 frames per second. In another example, the imager has a frame rate of at least 500 frames per second. In yet another example, the imager has a frame rate between approximately 500 frames per second and approximately 1,000 frames per second. Although certain frame rates of the imager have been described, it is to be understood that the imager may have any suitable frame rate.

With respect to the cueing sensor 16, the term passive sensor or passive imager, which refers to each of the at least one cueing sensors 16 configured to view/receive data observed through its FOV of the scene that is being observed, but does not actively produce or generate a source of energy that propagates outward from the sensor to thereafter obtain a received signal (such as that would be common with an active sensor, such as LIDAR or radar).

Processor 18 may be a computer processor, logic or series of logics, including therewith or in further communication with, one or more non-transitory storage mediums. The processor 18 may be capable of carrying out and executing a set of instructions or processes encoded thereon as further discussed herein. According to one aspect, processor 18 may be operationally connected to the other assets directly and/or indirectly and may be in further communication therewith. According to another aspect, processor 18 may be remote from the other countermeasure system 10 assets and may be in wired or wireless communication therewith. The particular connectivity and communication between processor 18 and other countermeasure system 10 assets may vary depending upon the desired implementation and installation parameters of countermeasure system 10 as discussed further herein.

FIG. 2 depicts that confirmation device 19 is a hardware component comprising confirmation logic 19A. Confirmation device 19 is physically mounted at the top or upper end of housing 22. In one particular embodiment, confirmation device 19 is located vertically above gimbal 23, which is sometimes known as the azimuth and elevation gimbal pointing head. In one particular embodiment, positioning or mounting the confirmation device 19 vertically above gimbal 23 provides advantages for system 10. Namely, by mounting confirmation device 19 above gimbal 23, it allows the confirmation device to be installed on a legacy housing 22 as an "after-market" addition or component. This, in turn, allows the confirmation device 19 to not require its own gimbal, but rather can piggy-back off the movement provided by gimbal 23 that is already existing/legacy hardware in the housing 22. However, confirmation device 19 does not need to be an after-market component. The confirmation device 19 may be fabricated with the remaining assets of housing 22 and still take advantage of the movement provided by gimbal 23. Thus, by mounting confirmation device 19 above gimbal 23, it allows for confirmation device 19 to result in a housing 22 having a lower size, weight, power and cost than a comparable housing and confirmation device combination in which the confirmation device has its own independent gimbal.

Further, by coupling the confirmation device 19 to the top of housing 22 above gimbal 23, the system 10 of the present disclosure enables the confirmation device 19 slew its signal output to the same direction as the optical component 24 is directed in response to the cue of the threat 28, as determined by cueing sensor 16. Particularly, this is beneficial at the azimuth cueing stage. With respect to elevation cueing stage, the elevation is covered by the beam 26.

Confirmation device 19 may be any suitable radar system capable of sending and/or receiving radar signals. Confirmation device 19 may further include one or more antennas 20 which may be an antenna array including one or more transmit and/or receiving antennas 20 as dictated by the desired implementation. These antennas 20 may be monopole, dipole, and/or directional antennas, or any combination thereof, and may be arranged in any desired configuration appropriate for the installation conditions. The antennas may also be any type of antenna array, such as an active electronically scanned array or an active phased array radar, or a passive electronically scanned array. According to one aspect, each of these antennas 20 may be a separate antenna array having multiple antenna elements or antennas contained therein.

Confirmation device 19 may further include or utilize one or more transceivers (not shown) which may be operable to transmit and/or receive radio waves via the antennas 20. According to this aspect, transceiver may include any type of transmitter, including but not limited to communications transmitters, radar transmitters, or signal jamming transmitters. Similarly, a transceiver may include any type of receiver, including but not limited to radio receivers, global navigation receivers, or very high frequency omni-direction range (VOR) receivers. According to another aspect, such a transceiver may include more than one type of transmitter and/or receiver therein.

Confirmation device 19 may generate a signal generated in response the Confirmation device 19 and/or beam generator having engaged the projectile 28. Then, there is confirmation logic 19A in operative communication with the processor 18 to process the signal, wherein the confirmation logic 19A is configured to direct the confirmation device 19 to determine that threat has been defeated or otherwise mitigated. Confirmation logic 19A interprets the received the signal from processor 18, and directs the confirmation device 19 to determine whether the launch of the projectile 28 is a real threat to platform 21.

Confirmation device 19 in one example is an active sensor configured to generate and transmit energy, electromagnetic radiation, or other signal outwardly from the device 19. In one particular embodiment, device 19 is radar-based or a radar. When device 19 is a radar or is radar-based, it may comprise either a single emitter or may be a phased array of emitters. This emitter or these emitters use Doppler Effect to detect if the projectile (or other object of interest) is moving toward the platform. More particularly, the emitter or these emitters utilize confirmation logic 19A to analyze the object's signature to determine whether the object is moving toward the platform. In this embodiment, the object's signature would be a projectile signature or a missile signature. The emitter or these emitters use Doppler Effect to detect if the projectile is moving rapidly toward the platform inasmuch as a projectile 28, such as a missile, can move on the order of 100-300 meters per second toward the platform. Thus, if confirmation device 19 is a radar or is radar-based, the device 19, coupled with confirmation logic 19A, detects or otherwise identifies a Doppler shift to indicate that that the object or projectile 28 is moving toward the platform at a velocity greater than 100 m/s. The confirmation device 19 has a very low false alarm rate because there are very few objects that move this quickly toward the vehicle that are not active threats.

When confirmation device 19 is a radar or radar-based device, there is a receiver, such as an antenna, that receives the signal back from the threat after being pinged with the radar signal from the confirmation device 19. The antenna of confirmation device 19 may be a different antenna than antenna 20, or it is possible to use the same antenna that would require antenna 20 being mounted above gimbal 23. One exemplary antenna is a horn antenna, which is typically cheaper and is physically reliable inasmuch as the horn antenna has no moving parts. Horn antennas do not electronically steer. Therefore, the horn antenna will rely on proper pointing by the gimbal 23 to be pointed in the proper direction to receive the signal generated by confirmation device 19. Some exemplary gains of the antenna that would suffice for this application have gains of 15, 20, or 25 dBi. A horn antenna would require a power amplifier to generate needed power.

An alternative receiver to receive the return signal of confirmation device 19 is an active electronically steered array (AESA) antenna, but it is more expensive than the horn antenna. An exemplary advantage of the AESA antenna is that it can electronically steer independently from the gimbal 23. There are other types of electronically steerable antennas. When an electronically steered antenna is utilized, the gimbal 23 performs rough pointing, then the electronically steered antenna performs fine pointing. Cost would be increased because the electronically steered antenna would require multiple transmit/receive modules. The cost benefit analysis may determine that an electronically steerable antenna is desirable because it provides or enables more precise bearing tracking, enabling better countermeasure effectiveness measurements and reporting.

One exemplary implementation of the antenna of confirmation device 19 may be enabled through the use of confirmation antennal logic comprising an antenna component made by Analog Devices, part number ADMV4828. This antenna component operates from 24.0-29.5 GHz. It is a transmit/receive Dual Polarization Beamformer. It has 16 TX/RX channels. It has high resolution vector modulators for phase control and high resolution digital gain amplifiers (DGAs) for amplitude control.

Confirmation device 19 can also determine the range to the target or projectile 28 which can help with the engagement. This may be accomplished by generating signals in the confirmation logic 19A, that is in communication with processor 18. Confirmation device 19 can use said signal from the confirmation logic 19A to assist in ranging the target. The ranging functionality may be accomplished by confirmation logic 19A or other ranging logic which may be integral to confirmation logic or may be a separate logic. Ranging logic may include at least one non-transitory computer readable storage medium having instructions encoded thereon that, when executed by at least one processor 18, implements operations to perform calculations to solve the range, range rate, or time-to-go with respect to object or projectile relative to platform based on a review of information obtained from confirmation device 19. Ranging logic, through the use of confirmation device 19 being radar-based or a radar, may also determine the velocity or acceleration of the missile, object or projectile 28. The velocity and/or acceleration is the provided to processor 18 that uses the same discriminate the type of threat that is inbound to the platform.

When confirmation device 19 is a radar or radar-based device, then it would only need to use a short blip to determine if a threat is present (i.e., whether projectile 28 is directed toward platform 21). This should only take less than 10 ms. Using a small blip of only several milliseconds reduces the RF signature of the vehicle or platform 21. In one particular embodiment, the use of a small (i.e., short timeframe—less than 10 ms) is used to "check" for the presence of an inbound threat (i.e., projectile 285). During the countermeasure engagement, longer pulses or even continuous operation of the confirmation device 19 radar or radar-based device may be beneficial to determine threat distance and if the defeat is completed.

In another example, confirmation device 19 may be a radar or radar based device that includes planar antenna technology resulting in a very low profile, lightweight unit. This is advantageous as confirmation device 19 needs to be relatively small. The term relatively small refers to a dimensional area that is equal to or smaller than the surface area of the top surface of the gimbal head. This exemplary confirmation device 19 may also include a surface mount assembled antenna board having a Silicon Quad Core IC. One exemplary antenna in confirmation device may provide +60 dBmi (1000 W) of effective isotropic radiated power (EIRP). Confirmation device 19 may perform electronic 2D or 3D beam steering using either digital or analog RF beam forming, with independent phase and gain control in both transmit (Tx) and receive (Rx) operating modes with programmable beam widths.

In another exemplary embodiment, the confirmation device 19 may be a radar or radar based device that detects objects (such as the threat) and measures their relative velocity and position. This exemplary confirmation device 19 or another exemplary confirmation device 19 may include four antenna elements that simultaneously transmit radar waves in the frequency range of the Ku band, the Ka band, or between 76 and 77 GHz. These signal waves are reflected by objects. By comparing the amplitudes and phases of the signal echo received by the antenna elements, precise conclusions on the threat or objects' position can be drawn. The relative speed and distance of objects is measured using Doppler Effect (shift in frequency between the reflected and transmitted signals) and time lag.

Confirmation device 19 is designed without any mechanically moving parts itself (inasmuch as it is directly mounted to the gimbal head that slews and rotates to eliminate the need for any moving parts of confirmation device 19 itself). Confirmation device 19 shall have a high mechanical vibration resistance allows the reliable operation in all ground based vehicle applications. The device 19 may have an integrated lens that is heated to allow full sensor performance even under bad weather conditions (snow and ice). This exemplary confirmation device 19 or another exemplary confirmation device 19 may be a monostatic Frequency Modulated Continuous Wave (FMCW) radar with four fixed beams. The high level of integration for the RF-functionality as well as for the sensor control unit and the signal processing impacts the reliability of the sensor. Therefore, sensor device 19 may use fully silicon based technology for the RF-components. The physical dimensions of one exemplary confirmation device may be 77 mm×74 mm×58 mm (Height×Width×Depth).

Figure 2A:
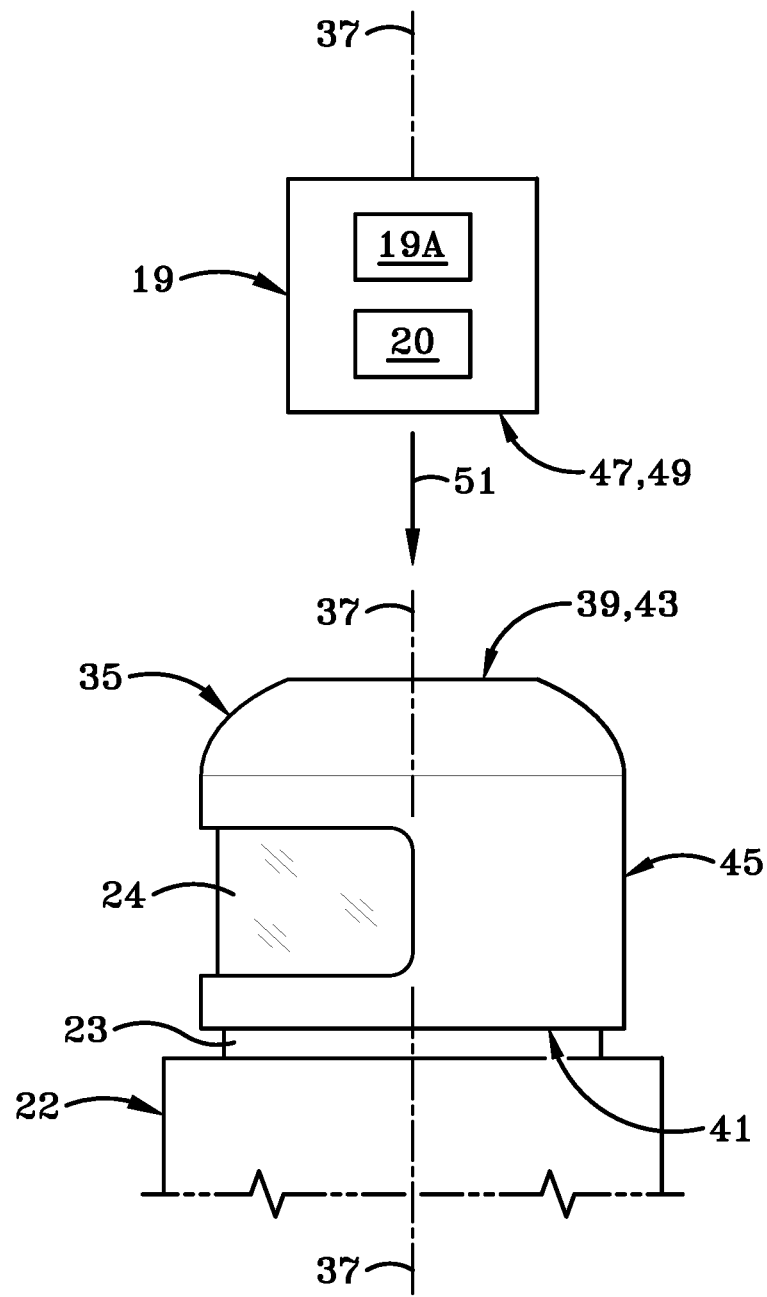
FIG. 2A is an enlarged exploded diagrammatic view of the confirmation device prior to connection with the gimbal head.

FIG. 2A depicts and exemplary exploded diagrammatic view of the confirmation device 19 relative to a gimbal head 35 mounted to gimbal 23. The gimbal head 35 is positioned atop the gimbal 23. Gimbal 23 is configured to rotate about a central axis 37. Gimbal head 35 includes a top end 39 and a lower end 41. The top end 39 defines an upwardly facing top or first surface 43 defining a first surface area. The first surface area is bound by an edge where the top 39 meets a vertical sidewall 45. The top surface 43 is configured to receive the confirmation device 19 thereon.

As shown in FIG. 2A, the confirmation device 19 is positioned above the top 39 of gimbal head 35. Confirmation device 19 includes a lower surface 47 that defines a second surface 49 having a second surface area. The bottom surface 49 and its second surface area is, in one particular embodiment, less than or equal to the first surface area defined by top surface 43. The confirmation device 19 may be mounted to the gimbal head 35 by lowering the confirmation device 19 as indicated by arrow 51 in order to mount the confirmation device 19 directly or indirectly to the top surface 43 of gimbal head 35. When the confirmation device 19 is mounted onto the top 39 of gimbal head 35, the bottom surface 49 of confirmation device 19 may directly connect with the top surface 43 of gimbal head 35. Alternatively, an intermediate layer may be sandwiched or positioned between surface 49 and surface 43 such that confirmation device 19 is indirectly coupled to gimbal head 35. The rigid connection between confirmation device 19 and gimbal head 35 allows the confirmation device 19 to move in unison with gimbal head 35 about the central axis 37 in response to rotational movement by gimbal 23. In one particular embodiment, gimbal head 35 and confirmation device 19 may fully rotate 360 degrees about the central axis 37. Additionally, because the beam optics 24 are located within the gimbal head 35, the beam optics 24 also rotate in unison with the gimbal head 35 and confirmation device 19 about the central axis 37 when the gimbal 23 permits such rotation.

While the confirmation logic 19A and the antenna 20 are shown as located within the confirmation device 19, it is to be understood that the confirmation device 19 will also include additional components that enable the confirmation to operate as a radar. For example, within the confirmation device 19 there may be various transmitters, receivers, transceivers, switches, duplexers, or other processing components such as analog to digital converters, digital to analog converters, amplifiers, filters, field programmable gate arrays or application-specific integrated circuits. Additionally, there may be components that enable multiple radars or confirmations to be utilized if so desired that would require various shielding devices between respective transmitters of adjacent confirmation devices atop the gimbal head 35.

Countermeasure system 10, as discussed previously herein, may be carried on a vehicle 21, which may be any type of suitable vehicle including land-based vehicles, manned or unmanned aircraft, and/or ships. It will be understood that countermeasure system 10 and the methods described herein may be readily adapted for use with multiple vehicle types. For purposes of clarity, as discussed and used further herein, the exemplary vehicle will be vehicle 21 which is depicted in the remaining figures as a land-based vehicle, such as a tank. Further, as used below, vehicle 21 may be described as a target 40 or target vehicle 40. References of this type are to be understood as equally applicable to all vehicle 21 types. Further, references to target 40 may also include other target types, including stationary land targets, such as buildings or radar installations. It will therefore be understood that the countermeasure system 10 of the present disclosure may be installed and applied from any suitable platform deemed desirable to protect from threats 28, as described herein.

Assets of countermeasure system 10 are illustrated throughout the figures in a generalized configuration and position; however, it will be understood that each individual asset may be placed and/or located at any position within or on vehicle 21 unless otherwise described. Accordingly, it will be understood that the particulars of the vehicle 21, (or other structure) on or with which countermeasure system 10 is carried or otherwise installed, may dictate the positioning and/or placement of individual assets thereon. The number, size, and type of assets employed may likewise vary depending on the specific platform employed and may be limited by the available space thereon as well as the load capacity of an individual vehicle 21. According to another aspect, assets may be moved or moveable between multiple positions depending upon the desired use for a specific mission or operation or as dictated by the particulars of the vehicle being used as discussed further herein. The specific configuration and placement of countermeasure system 10 assets on a vehicle 21 is therefore considered to be the architecture of the countermeasure system 10 and may be specifically and carefully planned to meet the needs of any particular countermeasure system 10. The architecture thereof may also be changed or upgraded as needed. For example, the system 10 may be modular, and custom configured based on the vehicle/platform type, mission profile, or targeted cost of the system.

Further, according to one aspect, the processes and systems described herein may be adapted for use with legacy systems, i.e., existing architecture, without a need to change or upgrade such systems. According to another aspect, certain assets may be legacy assets while other assets may be retrofitted for compatibility with legacy assets to complete or otherwise enhance countermeasure system 10 as discussed further herein.

As countermeasure system 10 is understood to be a defensive measure for a vehicle 21, such as a target vehicle 40, it is contemplated that vehicle 21 is likely to be the type operated in a hostile environment and may be subjected to varying threat levels, depending upon the particulars of the operation. Accordingly, it will be understood that countermeasure system 10 may utilize redundant or duplicative assets to maintain the functionality in the event of damage or loss of countermeasure system 10 components.

Having thus described the general configuration and components of countermeasure system 10, the operation and methods of use thereof will now be discussed.

With continued reference to FIG. 2, the general operation of countermeasure system 10 involves utilizing a beam of electromagnetic energy, indicated as beam 26, as a soft-kill countermeasure to counter a projectile or threat 28 (when the projectile 28 is a threat to the platform 21, it is also referred to herein as threat 28). Threat 28 may be a projectile that may include anti-tank guided munitions (ATGM), guided projectiles or munitions, such as missiles, SACLOS, SAL-H, LBR, or the like. Typically, these threats 28 include one or more guidance sensors 30 disposed either in the nose 31 or tail 32 regions of the threat 28. As depicted and discussed herein, threat 28 may be a guided missile; however, it will be understood that references to threat 28 could refer to any type of threat that may be faced by a target vehicle 21.

Guidance sensor 30 may be any suitable sensor, including optical sensors, which are typically employed with guided munitions to allow the specific threat 28 to be directed to its intended target 40. Guidance sensors 30 may interact with a guidance signal 33 that is typically produced from a source remote from the threat 28 itself, such as from a launcher 34 as discussed further herein.

At its most basic level of operation, countermeasure system 10 may interfere with the guidance sensor 30, the guidance signal 33, a signal generator 36 (i.e. the component generating the specific guidance signal 33), and/or one or more guide optics 38 (e.g. optical components used to visualize the position of threat 28 relative to its target 40) to attempt to neutralize the threat 28 by causing incorrect guidance commands to be sent to the threat 28 resulting in defeat of the threat 28, or in an attempt to cause the threat 28 to miss the target 40 by reducing the accuracy and ability of the threat 28 to maintain an accurate course to the target 40. A successful defeat of threat 28 may be realized as a successful attempt to redirect threat 28 away from a target 40, a detonation of the threat 28 away from the target 40, or the like as discussed further herein with reference to specific countermeasures.

With reference to FIGS. 3-7, threat 28 may be generally categorized by its method of guidance from a launcher 34 towards a target 40, such as vehicle 21. The successful defeat of threat 28 as contemplated herein may therefore vary depending upon which category, or more particularly which guidance type, threat 28 utilizes to steer itself towards target 40.

Figure 3:
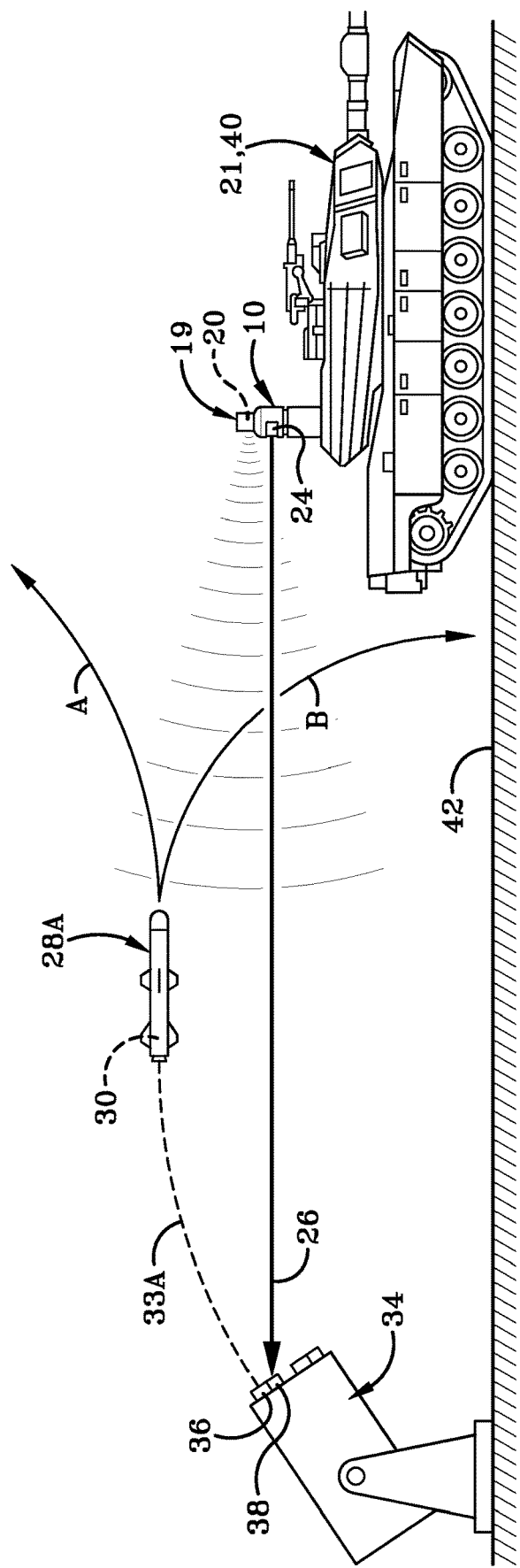
FIG. 3 is an operational view of an exemplary countermeasure system of the present disclosure engaged with a first threat type.

With reference to FIG. 3, a first category of threat 28 may utilize a guidance method typically referred to as semi-automatic command to line-of-sight (SACLOS) guidance. For this particular type of threat, indicated as threat 28A, utilizing SACLOS guidance method typically involves a missile tracking system or tracker containing a guide optic 38 co-located with a launcher 34. The guide optic is typically operable to track the location of the threat 28A relative to the target 40 via a beacon (such as a pyrotechnic flare, flashlamp, or the like—not shown in the figures but understood to be a common component of SACLOS threats 28A) carried by the threat 28A before sending guidance commands from a signal generator 36 (also co-located with the launcher 34) to the threat 28A. This guidance signal 33 sent from the launcher 34 to the threat 28A is received by guidance sensor 30, typically disposed on the tail 32 of threat 28A to keep the threat 28A aligned with the target vehicle 21. In countering threat 28A, countermeasure system 10 may detect the launch of the threat 28A and may emit a countermeasure beam, such as beam 26, to the launcher 34, or more particularly into the guide optics 38 of the missile tracking system co-located with the launcher 34 to disrupt the guidance system's ability to visualize the location of threat 28A relative to the target 40. In disrupting this visual tracking, the countermeasure system 10 may cause threat 28A to veer off course, for example, in the direction of arrow A in FIG. 3 wherein threat 28A misses the target 40 by overshooting and traveling past the target 40, or by causing threat 28A to be redirected, such as along path indicated by arrow B, into a surface 42 where it may detonate remote from the target 40. In one example, the surface 42 is a ground surface for a ground target, however, references to "ground," as used herein, are intended to refer to a surface 42 on which the target resides whether the "ground" is land or sea and the target 40 is a vehicle or ship.

Figure 4A:
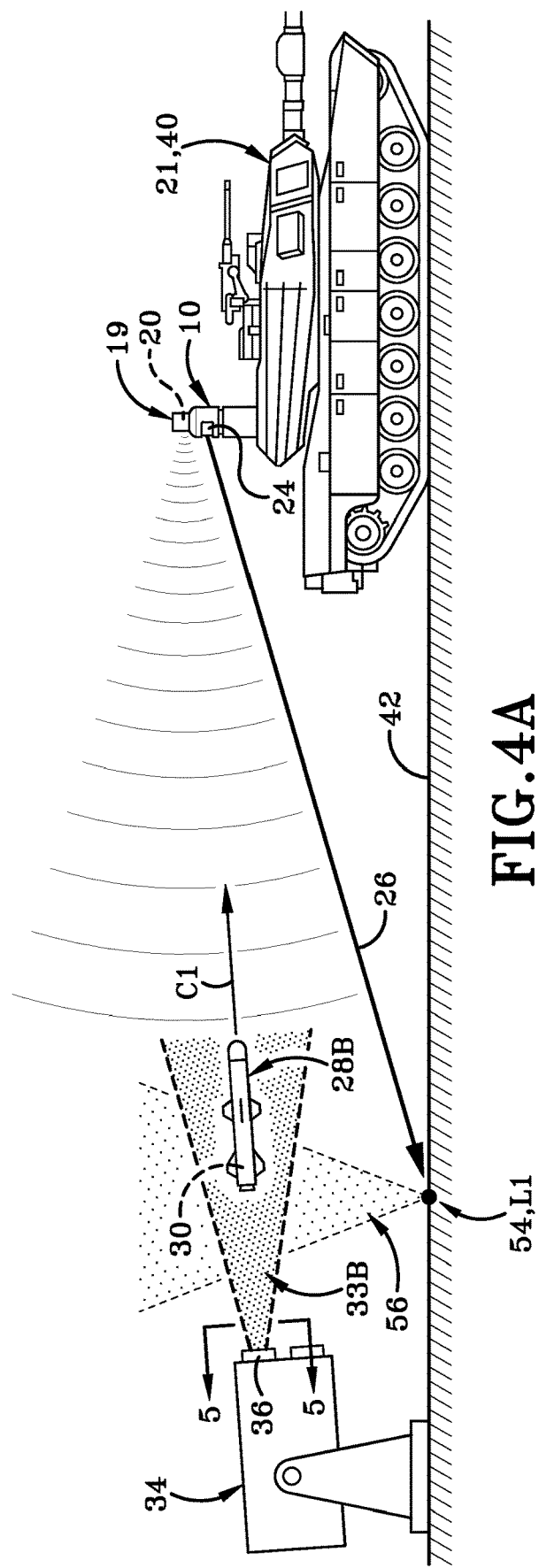
FIG. 4A is an operational view of an exemplary countermeasure system of the present disclosure engaged with a second threat type in a first position.
Figure 4B:
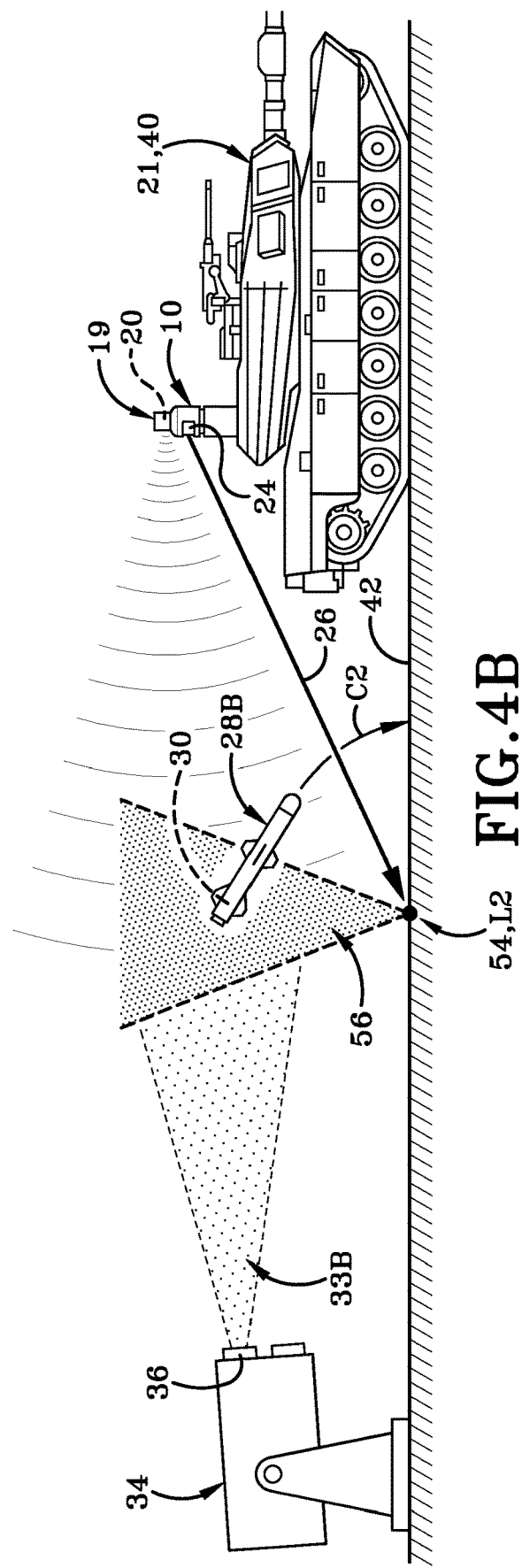
FIG. 4B is an operational view of an exemplary countermeasure system of the present disclosure engaged with the second threat type in a second positon.
Figure 5:
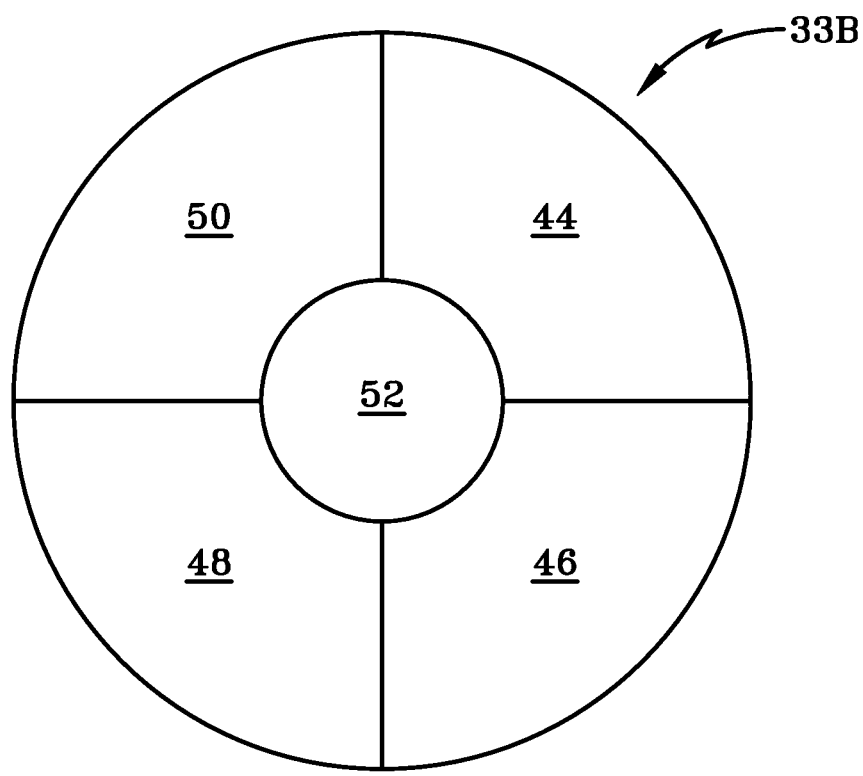
FIG. 5 is a cross sectional view of a guidance beam taken along 5-5 from FIG. 4A.

With reference to FIGS. 4A, 4B, and 5, a second type of threat 28B may utilize a second guidance method, typically referred to or known as optical beam riding. A beam riding threat 28B, or optical beam rider 28B, is a type of guided projectile that steers itself towards the target 40 via a heterogeneous optical beam generated from the launcher 34 in the direction of the target vehicle 21. The guidance beam or guidance signal 33B is best illustrated in FIG. 5 and may be segmented into regions consisting of multiple outer regions and a center region. Specifically, as shown in FIG. 5, one example of an optical beam 33B on which a beam riding threat 28B may travel may include a first quadrant 44 indicated as the high right quadrant when viewing the guidance beam 33B from the perspective of the target 40; a second quadrant 46 indicated as the low right quadrant; a third quadrant 48 indicated as the low left quadrant; and fourth quadrant 50 indicated as the high left quadrant. Guidance beam 33B may also include a center region 52 which is the portion of the guidance beam 33B which may be aimed at or otherwise considered "on target" with the target 40. Each quadrant 44, 46, 48, and/or 50 may be distinguishable to the beam rider 28B and/or to the guidance sensor 30 thereon, by way of an optical parameter that is different for each particular quadrant 44, 46, 48, and/or 50. For example, the optical parameter may include one or more of optical frequencies (light wavelength), modulation (intensity, phase, etc.), frequency or code, or polarization. According to one aspect, a beam 33B may have colored regions with each quadrant 44, 46, 48, and 50 corresponding to a different optical wavelength or color of light which may be or include wavelengths in the ultraviolet, visible, and/or infrared bands of the electromagnetic spectrum.

A beam riding threat 28 may then "ride" the guidance signal 33B by utilizing a rear or aft facing guidance sensor 30 disposed in the tail region 32 of threat 28B. Guidance sensor 30 may detect the region or quadrant 44, 46, 48, and/or 50 in which the threat 28B is currently located. Threat 28B may then utilize that information to direct itself back towards the center 52 or "on target" region of the guidance signal 33B, such as in the direction of arrow C1 in FIG. 4A. For example, if the first quadrant 44 utilizes a red light wavelength and the optical sensor 30 detects only red wavelengths, the threat 28B recognizes it is in the high right first quadrant 44 and will redirect itself down and to the left to bring the threat 28B back into the center region 52. By continuously adjusting its flight in this manner, threat 28B may insure it remains on target as it travels between the launcher 34 and the target 40.

Unlike a SACLOS threat 28A, a beam riding threat 28B cannot be defeated by a soft-kill countermeasure wherein beam 26 is directed back at the launcher 34 as there is no guide optic 38 to obscure or otherwise confuse. Similarly, as with SACLOS threats 28A, beam riding threats 28B may not be disrupted by directing beam 26 directly at the threat 28B as the guidance sensor 30 is located in the tail region 32 of the threat 28B and is aft facing. Accordingly, countermeasure system 10 may utilize a technique in which beam 26 is directed at the ground surface 42 immediately behind the threat 28B and a beam spot 54 is generated thereon. This beam spot 54 may generate a backscatter 56 of electromagnetic energy (e.g. light) which may reflect off the ground surface 42 and back into the guidance sensor 30 of threat 28B. This backscatter 56 may overwhelm the guidance signal 33B and may cause threat 28B to redirect in a desired direction, such as along the path indicated by arrow C2 in FIG. 4B and into the ground surface 42. This technique is particularly effective as it is desirable for the guidance system to utilize the weakest possible guidance signal 33B to avoid revealing the location of the launcher to the target 40 or to other observers in the field. Thus, utilizing a beam 26 that is more powerful than the guidance signal 33B may allow the backscatter 56 to rapidly overcome the strength of the guidance signal 33B which may then cause the threat 28B to redirect.

As discussed further below, the specific type of beam riding threat 28B as well as the specific parameters of the guidance signal 33B may be determined via the confirmation device 19 which may reveal or indicate the specific wavelength(s) desired for use with beam 26. For example, where the upper quadrants, such as first quadrant 44 and/or fourth quadrant 50 utilize colored light, beam 26 may be replicated in the same wavelength as one of the upper quadrants 44 and/or 50 to cause the threat 28B to believe it is high of the center region 52 and may cause it to steer downwards along the path indicated by arrow C2 and into the ground surface 42. Since beam 26, and more particularly backscatter 56 coming from the beam spot 54 thereof, may overwhelm the guidance signal 33B and may further not include a center region 52, the threat 28B may be fooled into thinking it is continuously operating high of its intended target path and may constantly steer downwards until it impacts the ground surface 42 away from target 40.

Figure 6:
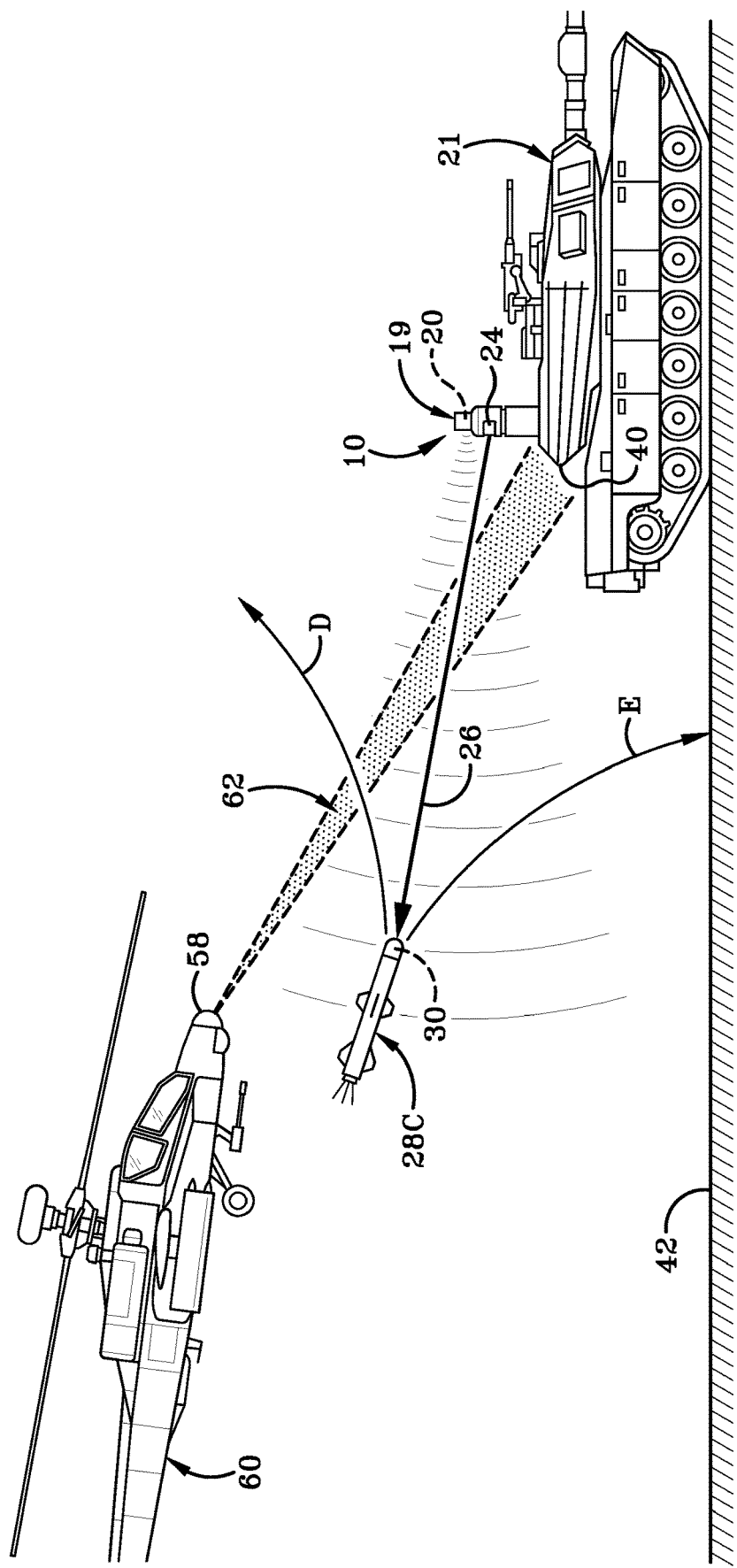
FIG. 6 is an operational view of an exemplary countermeasure system of the present disclosure engaged with a third threat type in a first manner.
Figure 7:
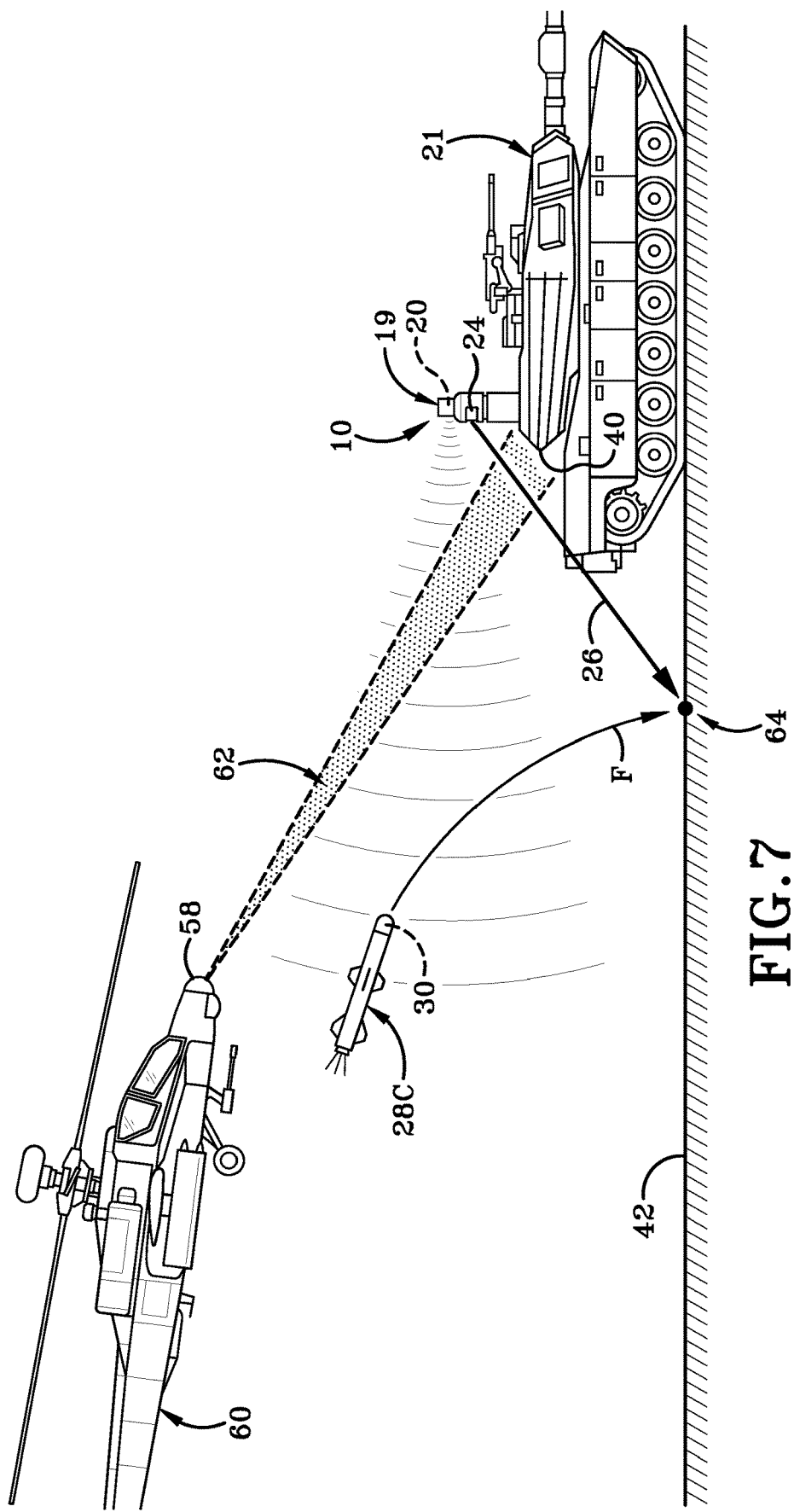
FIG. 7 is an operational view of an exemplary countermeasure system of the present disclosure engaged with the third threat type in a second manner.

With reference to FIGS. 6 and 7, a third type of threat, indicated as threat 28C, utilizes a guidance method that does not rely on communication with the launcher 34, but instead utilizes a forward-facing guidance sensor 30 disposed in or around the nose 31 of the threat 28C to locate a target 40 and perform guidance independently. One particular example of this type of guidance is a laser semi-active homing (SAL-H) which involves painting or otherwise designating the target 40, such as vehicle 21, with a designator beam 62 generated from a laser designator 58. According to one example, this laser designator 58 may be carried by an enemy vehicle 60 such as a helicopter, as depicted in FIGS. 6 and 7, or may be generated by a secondary source, such as a ground solider or other ground based installations. The SAL-H threat 28C then may utilize the guidance sensor 30, which may be a forward-facing seeker, to detect the reflection of the designator beam 62 off of the target 40 to steer itself towards the target 40.

While designator beam 62 may originate from an enemy vehicle 60, such as a helicopter as shown in the figures, it will be understood that designator beam 62 may be generated from any suitable location operable to direct threat 28C towards the target vehicle 21. For example, designator beam 62 may originate from an enemy vehicle 60 which may also be the launcher 34 or launch platform for the threat 28C, or may be co-located with the launcher. According to another example, designator beam 62 may originate from a location remote from the launcher 34 of threat 28C.

Countermeasure system 10 may address this category of threat 28C, such as SAL-H threats 28C, in one of two ways. A first method of countering such a threat 28C is illustrated in FIG. 6 wherein countermeasure system 10 may generate beam 26 in the direction of the threat 28C, thereby flooding or overwhelming the guidance sensor 30 and causing the threat 28C to miss the intended target 40. As shown in FIG. 6, threat 28C may veer in a separate direction away from target vehicle 21, for example, along the path indicated by arrow D causing threat 28C to overshoot the target 40 or alternatively along a path such as the path indicated by arrow E causing threat 28C to redirect into the ground surface 42.

FIG. 7 depicts a second method addressing SAL-H threats 28C wherein countermeasure system 10 may direct beam 26 to a spot on the ground surface 42 away from the target vehicle 21. This spot may be known as a decoy spot 64 and may be matched to the wavelengths of the laser designator 58 and/or designator beam 62 to divert the attention of the guidance sensor 30 in threat 28C. This may cause threat 28C to interpret the decoy spot 64 as the target 40 location and may cause threat 28C to steer downwards towards the decoy spot 64 and into the ground surface 42. According to this method, the beam 26 may be more powerful than designator beam 62 and may take into account such factors as the angle of incidence of threat 28C to determine the proper placement of decoy spot 64 on the ground surface 42 remote from target vehicle 21. By utilizing confirmation device 19 information providing the bearing of the incoming threat 28C, the laser decoy spot 64 may be optimally placed on the ground 42 at an angle relative to the threat 28C to maximize the reflected energy reaching the threat 28C missile seeker (e.g. guidance sensor 30). Detection of a SAL-H threat is done by detecting the laser pulses from the designator. This is an additional sensor on top of the gimbal or elsewhere on the vehicle that detects the presence of laser pulses on the vehicle. It may also determine the direction and intensity and pulse frequency of the laser designator beam 62 or signal. This may be though use of an array of optical detector elements tuned to the designator wavelength, and placed in such a manner that a full 360 degree continuous field of view is achieved.

With continued reference to FIGS. 3-7, each of the described countermeasures employed by countermeasure system 10 integrate with the assets in that the use of confirmation device 19 with the soft-kill countermeasures described herein enhances or otherwise allows each countermeasure to be effective against varying threats. In particular, confirmation device 19 may be first utilized to determine what type of threat 28 is being employed. As there are over 100 different known types of missile threats alone, it will be understood that a countermeasure designed for a specific threat type or threat category may not be particularly effective against other known threat 28 types. Accordingly, utilizing confirmation device 19 for threat detection may allow the target 40 to properly determine not only the category in which the threat 28 falls, e.g., SACLOS, beam-riding, or SAL-H guidance systems, but also what specific type of threat 28 is being faced. For example, two different beam-riding threats 28B might fall into the same category, i.e., beam-riders, but one may utilize a four quadrant guidance signal 33B as described with the examples shown in FIGS. 4A, 4B, and 5, while a second beam-riding threat 28B may utilize a guidance signal 33B having three guidance regions in the guidance beam 33B. Further, the first threat 28B in this example may utilize red in one of the upper quadrants, such as first quadrant 44 or fourth quadrant 50, while the second threat 28B in this example may utilize red in one of the lower guidance beam 33B portions. Therefore, a countermeasure deploying a red laser beam 26 against the first threat 28B would cause that threat 28B to be steered into the ground surface 42 while a red laser beam 26 against the second threat 28B of this example would cause that threat 28B to be steered up and/or to the side, potentially into a less desirable position. Thus, it is important to know not only the category, i.e., the guidance method, used by a threat 28, but also the specific type and nature of the threat 28.

Confirmation device 19 may allow for conveying real time data to the processor 18 relating the elevation, velocity, flight pattern, spin rate, control surfaces, cross-section, size, and the like of the threat 28 immediately after the cueing sensor 16 detects the firing thereof. Then, confirmation device 19 may communicate this data to processor 18 which may utilize this real time data as a fingerprint of known threat types and may compare it to a prepopulated or pre-stored database of known threat types to determine what the threat is most likely to be. This process may narrow the incoming threat 28 down to a single or a small group of possible threats to better tailor the specific countermeasure to be employed by countermeasure system 10. This information may allow the countermeasure to be adjusted according to the threat type for elements such as beam size, beam color, beam frequency, beam position, polarization, or the like.

An additional feature improved by the use confirmation device 19 mounted on housing 22 within a soft-kill countermeasure system 10 is that previous soft-kill systems having only a cueing sensor 16 and a tracking radar mounted elsewhere on the platform required constant monitoring by the tracking radar which makes the platform susceptible to detection. Thus, previous soft-kill systems utilizing just a cueing sensor 16, or cueing sensor and a tracking radar. The prior tracking radar(s) on the platforms would allow for this confirmation through the active radar data collected by looking for signs that the threat 28 is no longer active. However, active radar made the platform more susceptible to enemy detection. Stated otherwise, the active monitoring by the tracking radar increased vulnerability of the platform as the signals from the tracking radar could be detected by a hostile enemy.

The confirmation device 19 of the present disclosure improves these previous techniques by providing an independent confirmation device signal, that is short in time, generated by device 19 located above gimbal 23 to confirm that the threat has been defeated. As stated herein, the confirmation device 19 generates a signal that may be active for a period of time in a range form 10 ms to 100 ms. This reduces the time at which the radar signal from confirmation device 19 can be detected by a hostile enemy. In one example, the signal transmitted and emitted from confirmation device 19 is a radio frequency in the Ku band (12-18 GHz), which may be the signal baseline. In another embodiment the signal from confirmation device 19 may have a higher in frequency (o somewhere in the 30-43 Ghz range and shrink the size somewhat, however there are tradeoffs. Namely, higher bands (such as Ka band=26-40 GHz) have attenuation from rain, and more scatter from smaller features. Additionally, the polarization should be vertical to minimize multi-path and more robust against clutter rejection. Alternatively, Circular polarization may be used to be more robust against jamming.

Confirmation device 19 typically has 10-20 W peak power. The duty cycle is likely about 20%, so the average power is only about 2-4 W. The size of confirmation device 19 is small enough to fit on top of a typical soft-kill countermeasure gimbal head above gimbal 23. Further, the weight of confirmation device 19 is low enough to minimally impact gimbal slew rates. It is to be understood that 10× smaller targets need 10× power, and 2× longer range needs 16× power.

With regards to SACLOS targets 28A, the confirmation device 19 enhances a soft-kill countermeasure for these types of threats 28A by utilizing the real time information to properly identify the threat 28A to customize the countermeasure to that particular threat 28A and to confirm, via confirmation device 19, that the threat 28A has been defeated.

With regards to beam-riding threats 28B, confirmation device 19 may allow for the countermeasure described herein to confirm that the threat has been defeated in that confirmation device 19 may first allow for proper identification of a beam-riding threat 28B while also determining the specific type of beam-rider 28B that is being deployed. From here, the countermeasure may be tailored to utilize the proper wavelength or beam 26 parameter to guide the threat 28B in the desired direction. For example, where the threat 28B utilizes a guidance signal 33B with red light in the upper sections 44 and/or 50, the countermeasure deployed may utilize similar red light or red wavelength to steer threat 28B downwards along the path indicated by arrow C2 in FIG. 4B and into ground surface 42 as discussed previously herein. Additionally, confirmation device 19 may enhance this particular countermeasure in that the beam spot 54 is most effective when projected just behind the threat 28B such that the backscatter 56 overwhelms the guidance signal 33 at the guidance sensor 30. As seen in FIG. 4A, when the beam spot 54 is at a closer distance to the launcher 34 and signal generator 36, such as location L1, the backscatter 56 may be more diffuse and may not be powerful enough to immediately overcome the guidance signal 33B. Thus, as threat 28B moves towards the target vehicle 21, the ideal countermeasure would likewise move the beam spot 54 along the ground surface 42 behind the threat 28B. As shown in FIG. 4B, when the beam spot 54 then reaches a second location, such as L2, that is further from the launcher 34 and signal generator 36, the backscatter 56 may then overtake the guidance signal 33B and cause the threat 28B to veer into the ground surface 42 away from the target 40. Confirmation device 19 allows for countermeasure system 10 to account for whereabouts of threat 28B at all times, thus allowing for proper placement of beam spot 54 and movement thereof behind threat 28B as it moves towards target 40.

With regards to the SAL-H threats 28C as depicted in FIGS. 6 and 7, the confirmation device 19 may enable or enhance the effective countermeasures according to the following: With reference to the countermeasure wherein beam 26 is aimed directly at the threat 28C to overwhelm or otherwise disable the threat 28C and the guidance sensor 30 carried thereon, confirmation device 19 allows for countermeasure system 10 to properly track the location and position of threat 28C to direct the beam 26 to the proper location; Where the chosen countermeasure deployed against SAL-H targets 28C involve the use of a decoy spot 64 to direct the threat 28C into the ground surface 42, confirmation device 19 enhances this countermeasure by allowing countermeasure system 10 to determine the specific type of threat 28C, thus allowing further determination of the proper wavelength, angle of incidence, and/or decoy spot 64 position for beam 26 to be most effective in countering threat 28C.

Again all of these soft-kill countermeasures may be enhanced in that confirmation, via confirmation device 19, of the defeat of a threat 28 may allow for more rapid switching to secondary threat targets and/or further deployment of countermeasures where a threat 28 is detected as continuing. Further, the use of confirmation device 19 with soft-kill countermeasures, particularly in scenarios where a vehicle is equipped with both soft-kill and hard-kill countermeasure systems including countermeasure system 10 may allow for seamless integration thereof. Further, confirmation device 19 may be integrated with both soft-kill and hard-kill countermeasures, thus allowing immediate hard-kill response when it is determined that the soft-kill countermeasures were ineffective.

Figure 8A:
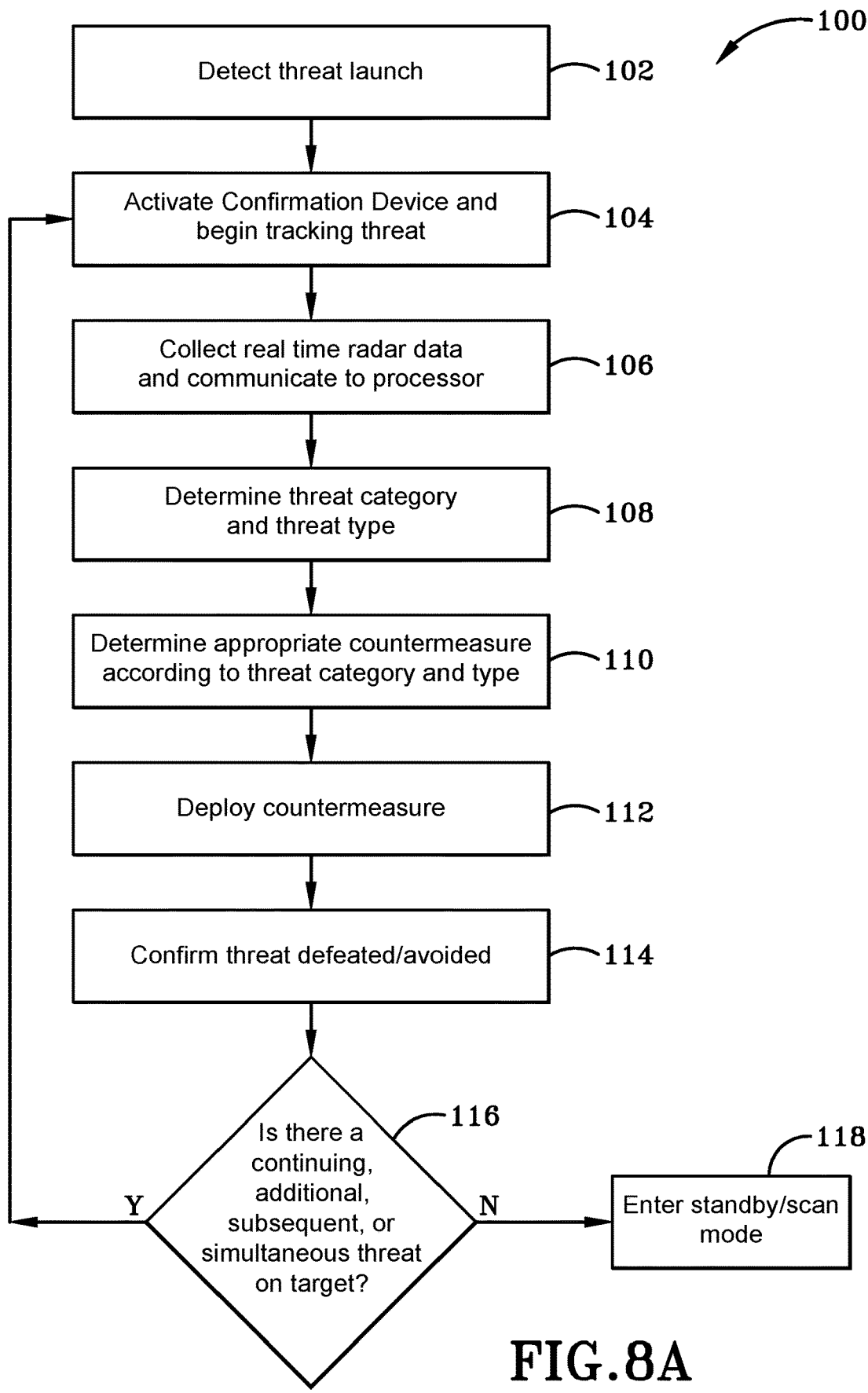
FIG. 8A is an exemplary flow chart illustrating a method of operation for a countermeasure system of the present disclosure.

With reference to FIG. 8A, a method of use for countermeasure system 10 shown by way of a representative flowchart and indicated as process 100. Process 100 is illustrated from the point of view of a target 40, such as a vehicle 21, in that process 100 will be understood to be the process undertaken to counter a threat 28 launched against the target 40 itself. Therefore, first, the target 40 may detect the launch of a threat 28 via the cueing sensor 16 or other optical detection device. The detection of the threat 28 launch is indicated as step 102 and may be accomplished by monitoring the surrounding regions around vehicle 21 for an emission of light or exhaust plume that typically accompanies the launching or firing of a threat 28. This flash of light is commonly referred to as muzzle flash. The confirmation device 19 having logic 19A is attached to the top of the gimbal 23. When the gimbal 23 is commanded to slew to the detected missile or threat position, the confirmation device 19 moves with the gimbal 23 and will point in the general direction of the detected launch location of the threat 28 or missile. The gimbal 23 will point the confirmation device 19 in the general direction, and then the beam from confirmation device 19 is large enough to cover the angular uncertainty of the handover location provided by the threat cueing sensor 16. The handover uncertainty is typically a small value, such as 1 degree or less. Once a muzzle flash is detected by the cueing sensor 16, the confirmation device 19 may be activated and may orient towards the muzzle flash to begin tracking the threat 28, shown as step 104.

The confirmation device 19 may then begin to collect radar data relating to various real time information about the threat 28, including position, velocity, and the like. In step 106, these data are then provided in real time to the processor 18 to allow for identification of both the threat 28 category and the specific type of threat 28.

Next, in step 108, the processor 18 may determine both the threat 28 category and threat 28 type through the comparison of the radar data collected and provided to processor 18 in step 106 to a database of known threat types. Cueing sensors (such as cueing sensor 16) typically operate in the infrared, but, like visible light color digital cameras, may employ a color filter array to allow detection of two or more infrared "colors" in the captured image. Differences in the intensities of these infrared colors could be used to characterize the exhaust plume chemistry and narrow the list of possible threats. When countermeasure system 10 is equipped with a cueing sensor 16 having a color filter array, the radar data may be optionally combined with optical spectrum data obtained from the multi-color cueing sensor 16 focal plane arrays, which could further narrow the list of possible threats to identify the specific threat 28. This may allow processor 18 to further determine the best countermeasure to be deployed based on the specific threat type. This countermeasure determination is indicated in process 100 at step 110.

Once the appropriate countermeasure has been chosen in step 110, that countermeasure may be deployed by countermeasure system 10. As discussed herein, these countermeasures may include generating beam 26 from beam generator 14 and directing beam 26 to the appropriate position based on the threat type and chosen countermeasure. The deployment of the chosen countermeasure may be indicated as step 112.

While the chosen countermeasure is being deployed in step 112, the confirmation device 19 may continue to track the threat 28, providing real time information about the threat 28. Confirmation device 19 may include including a defeat confirmation signal once it is determined that the threat 28 has been disabled or otherwise avoided. The threat defeat confirmation signal, via confirmation device 19, may be indicated as step 114 in process 100.

Throughout process 100, the countermeasure system 10 or more particularly cueing sensor 16 may continuously monitor for additional muzzle flashes to detect additional, subsequent, or simultaneous threats 28 against the target vehicle 21. Thus, once a threat 28 is defeated and a confirmation, via confirmation device 19, thereof is provided in step 114, countermeasure system 10 may perform a check for additional active threats 28 in the area. This threat check may be performed as step 116 in process 100. If an additional act of threat 28 is detected, the process 100 may repeat beginning with step 104 with confirmation device 19 now directing towards the additional threat 28 as depicted in FIG. 8A. If no additional acts of threat 28 are detected, the countermeasure system 10 may enter a standby or active scanning mode wherein the cueing sensor 16 continues to monitor for muzzle flashes and additional future threats 28, but wherein confirmation device 19 and other countermeasure system 10 assets are otherwise inactive.

Figure 8B:
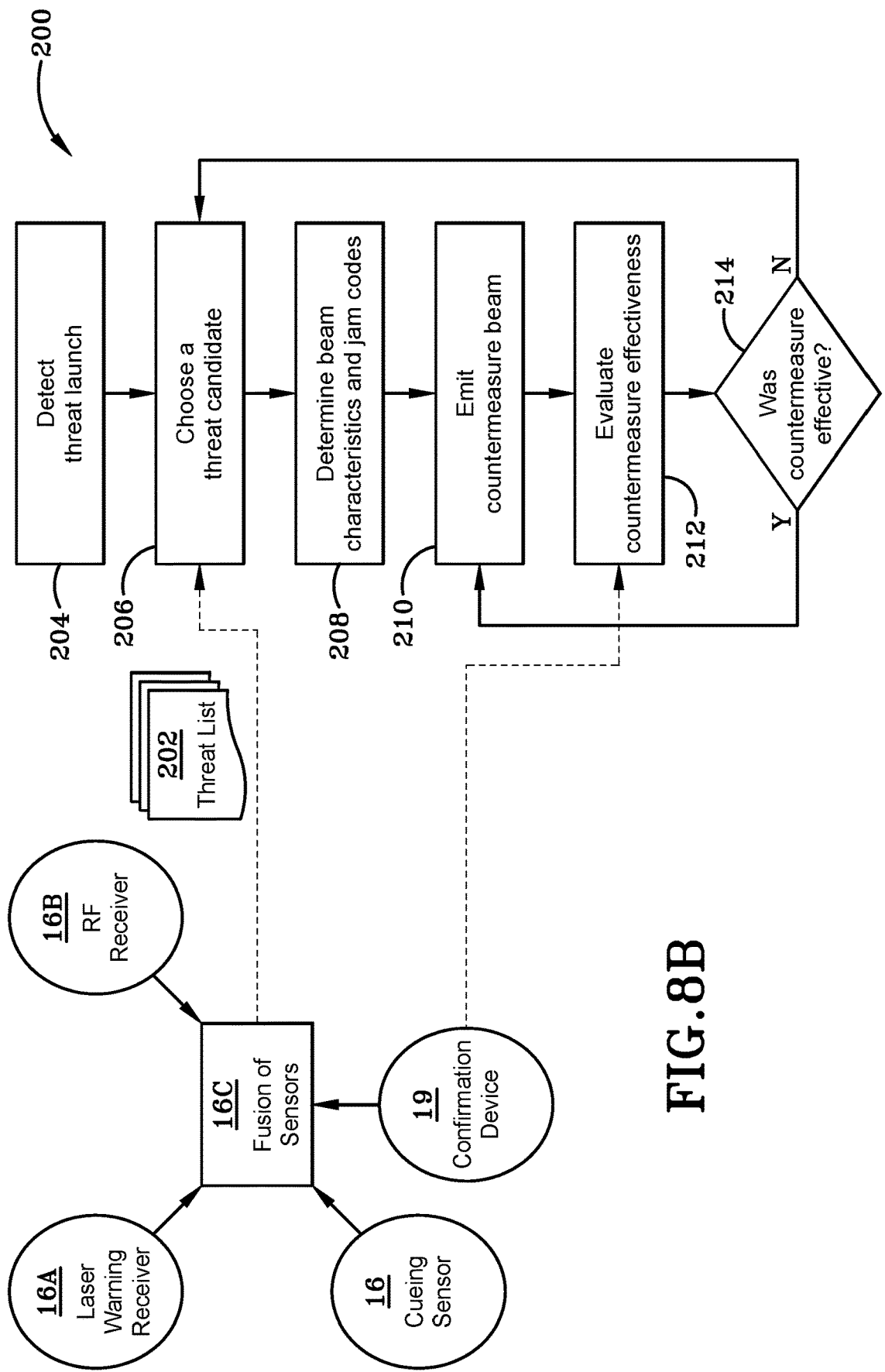
FIG. 8B is an exemplary flow chart illustrating another method of operation for a countermeasure system of the present disclosure.

According to another embodiment, as shown in FIG. 8B, process 200 may be employed by countermeasure system 10 according to the following. First, a list of multiple possible threats 28 in a threat list 202 that may be sorted by confidence level. Then once a launch is detected, show as step 204 a threat 28 candidate may be chosen in step 206. The threat 28 candidate is contemplated to be the first threat on the threat list 202 and may be chosen according to a fusion between the cueing sensor 16, and the confirmation device 19 and its various components (e.g. laser warning receiver 16A, RF receiver 16B, if equipped). This fusion of sensors is shown in FIG. 8B as reference element 16C. The fusion of the sensors 16C may provide details to the processor 18 to allow the threat list 202 to be narrowed to only those threats 28 that match the profile of the detected threat 28, at which point the characteristics of the countermeasure beam 26 may be chosen, and any jam codes (i.e. patterns or waveforms of intensity modulation for the beam 26 may be determined according to a model of the first threat 28 in the threat list 202. The determination of beam 26 characteristics and jam codes is shown as step 208. Next, the countermeasure beam 26 may be emitted in step 210.

Once the countermeasure beam 26 is emitted in step 210, the confirmation device 19 may be employed to detect any deviations in the flight path of the threat 28 as a result of the countermeasure beam 26 as compared to the flight path of threat 28 prior to emitting beam 26. These data from the confirmation device 19 may then be used to evaluate the countermeasure effectiveness based on threat 28 flight trajectory changes. This evaluation may take place as step 212 in process 200. Countermeasure system 10 may then make a determination if the chosen countermeasure beam 26 is effective. This determination is shown as step 214 in process 200. If the chosen countermeasure is determined to be effective by the detection of a deviation in the flight path of the threat 28 via confirmation device 19, the countermeasure beam 26 may continue to be emitted as long as the confirmation device 19 continues to show an effect on the flight path trajectory of the threat 28, or until confirmation device 19 indicates that threat 28 is defeated.

If the chosen countermeasure is determined to be ineffective, a new threat 28 candidate may be chosen according to a model of the next threat 28 in the threat list 202 and a different countermeasure (e.g. with different beam 26 characteristics and/or jam codes) may be employed.

Figure 9:
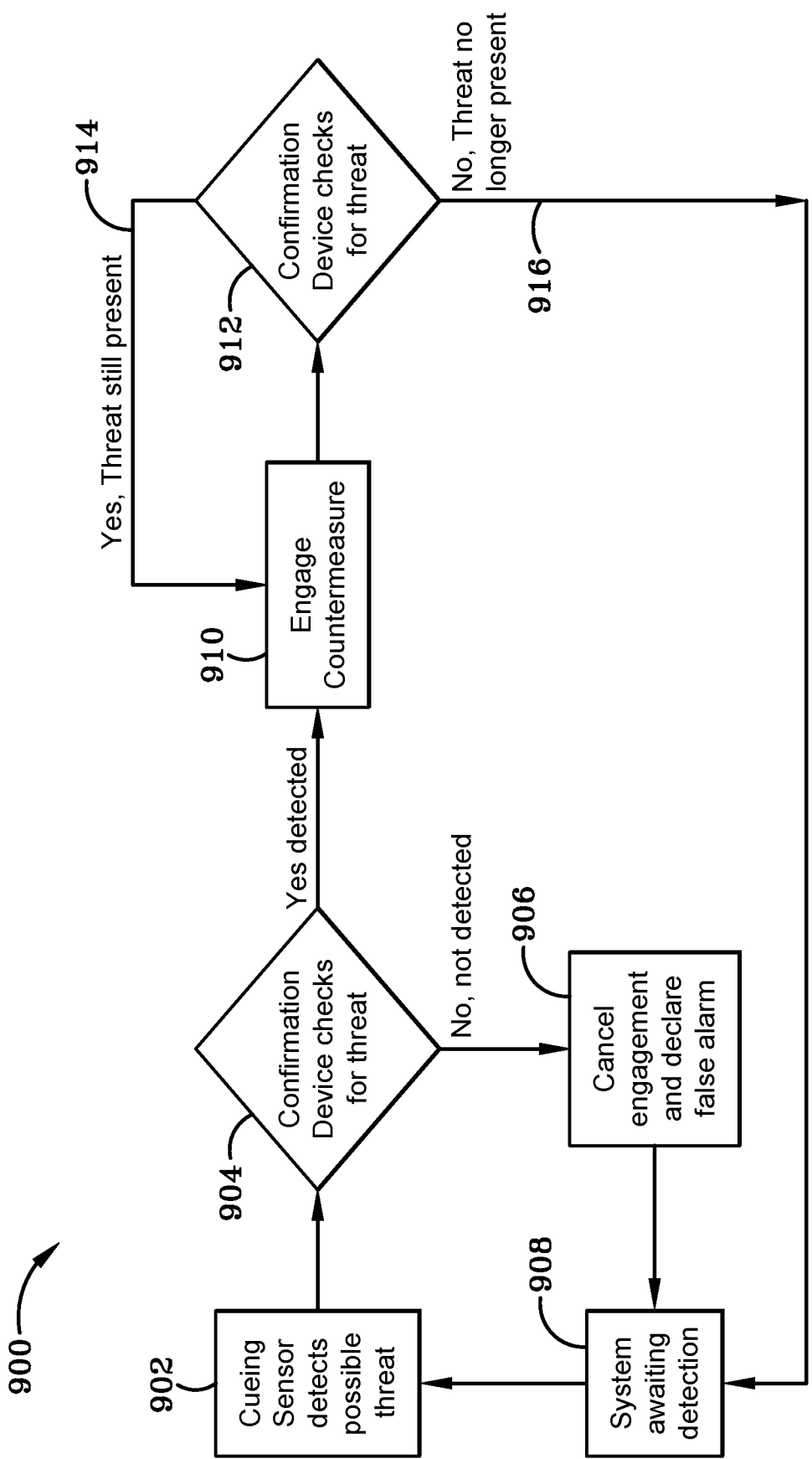
FIG. 9 is an exemplary flow chart illustrating another method of operation for a countermeasure system of the present disclosure.

FIG. 9 depicts another exemplary embodiment according to another aspect of the present disclosure, the method is shown generally at 900. The method 900 provides that when the system receives a cue, from cueing sensor 16, that a possible threat is detected the gimbal system or gimbal 23 slews to the Azimuth and Elevation of the threat 28, which is shown generally at 902. The confirmation device 19 is carried by the gimbal head (i.e., above the gimbal) such that it rotates in unison with the optics 24 so the beam 26 may be directed toward threat 28.

Confirmation device 19, after having been rotated by the gimbal 23 in unison with the assets contained in the gimbal head above the gimbal 23, the confirmation device generates a short signal to check whether the detection or threat 28 is a real threat to platform 21, which is shown generally at 904. Wherein the term real threat refers to whether the threat 28 will cause damage to the platform 21 or has otherwise targeted the platform 21 as target 40 and evasive action or countermeasure action is needed by the platform 21. In one particular embodiment, the short signal refers to a signal that is short relative to a period of time. The short signal in one embodiment has a period of time for which is generated that lasts approximately 10-100 milliseconds.

If at step 904 it is determined that there is not a real threat to the platform 21, then a determination or declaration is made that the detection is a false alarm, which is shown generally at 906. From the false alarm declaration or determination (step 906), the system may return to a ready state to await other detections, which is shown generally at 908.

If at step 904 it is determined that there is a real threat to the platform, then the countermeasure is engaged, which is shown generally at 910. In one particular example, the determination that the threat is a real threat to the platform is based on the confirmation device 19 and the confirmation logic evaluating the target signature to confirm that the detection is a real threat.

Subsequent to the countermeasure engagement at 910, the confirmation device 19 continues to check for threat presence during the engagement, which is shown generally at 912. The checking of the target presence may run through a feedback loop 914 to continue checking the threat presence during engagement, wherein the confirmation device 19 repeats the checking of the target presence until there is no more threat presence.

When the threat is defeated, and is no longer present as shown at 916, and the command to disengage the countermeasure is given. In one example, the confirmation device 19 confirms that the Doppler signature of the threat is no longer present. Once the threat is defeated or otherwise not present, the system returns the ready state at 908.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that are executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system for a soft-kill countermeasure comprising:
a platform;
at least one cueing sensor on the platform operable to detect a launch or movement of a projectile;
a processor in operative communication with the at least one cueing sensor;
a soft-kill countermeasure housing including a top end and a bottom end, wherein the top end is above the bottom end, and a gimbal coupled to the soft-kill countermeasure housing;
a countermeasure transmitted outward from the soft-kill countermeasure housing; and
a confirmation device positioned adjacent the top end of the soft-kill countermeasure housing above the gimbal, and the confirmation device is in operative communication with the processor to track and locate the projectile and to determine a category and type of threat posed by the projectile from data collected by the confirmation device, and the processor operable to generate a threat cue and determine whether the threat cue is a real threat or a false alarm, and if it is determined that the threat cue is the real threat, then the confirmation device determines when the real threat is defeated by the countermeasure.

2. The system of claim 1, further comprising:
beam optics carried by the soft-kill countermeasure housing positioned above the gimbal; and
wherein the confirmation device is positioned above the gimbal.

3. The system of claim 2, wherein the confirmation device is located above the beam optics.

4. The system of claim 1, further comprising:
a gimbal head located above the gimbal, the gimbal head including a first surface having a first area;
the confirmation device including a second surface, wherein the second surface is coupled to the first surface of the gimbal head and adapted to move in unison with the gimbal head about the gimbal.

5. The system of claim 1, wherein the confirmation device is a radar that is in operative communication with the processor.

6. The system of claim 1, further comprising:
a signal generated by the confirmation device in response to the at least one cueing sensor viewing the projectile; and
confirmation logic in operative communication with the processor to determine that the real threat has been defeated.

7. The system of claim 6, further comprising:
a second signal generated by the confirmation device in response to the confirmation device having determined the projectile has been defeated; and
wherein the confirmation logic causes the confirmation device to cease radiation emission in response to the second signal.

8. The system of claim 6, wherein the signal is a confirmation signal generated for a period of time in a range from about 10 ms to about 100 ms.

9. The system of claim 6, wherein the signal is a confirmation signal generated in a Ku Band ranging from about 12 GHz to about 18 Ghz.

10. The system of claim 6, wherein the signal is a confirmation signal generated in a Ka Band ranging from about 26 GHz to about 40 GHz.

11. The system of claim 1, further comprising:
a signal generated by the confirmation device in response to the at least one cueing sensor having detected a launch or movement of the projectile; and
confirmation logic in operative communication with the processor to direct the confirmation device to track the projectile.

12. The system of claim 11, wherein the signal is a tracking signal that is continuously generated while the projectile is tracked.

13. The system of claim 1, wherein the at least one cueing sensor is a passive cueing sensor comprising an image sensor having a field of view adapted to observe landscape remote from the platform.

14. A method of deploying a soft-kill countermeasure comprising:
providing a soft-kill countermeasure housing carried by a platform, the soft-kill countermeasure housing having a gimbal carrying a gimbal head;
detecting an object via at least one cueing sensor;
slewing a confirmation device in unison with the gimbal head about the gimbal, wherein the confirmation device is mounted on the gimbal head and located above the gimbal;
tracking a position of the object via the confirmation device;
communicating the position of the object to a processor;
deploying a countermeasure from the soft-kill countermeasure housing;
monitoring, via the confirmation device, the object in response to the countermeasure having been deployed; and
determining, via the confirmation device or the processor, whether the object has been defeated by the countermeasure.

15. The method of claim 14, further comprising:
generating, via the confirmation device, a signal in response to the at least one cueing sensor having viewed the object;
receiving the signal in confirmation logic in operative communication with the processor; and
determining, via the confirmation logic or the processor, that the object has been defeated by the countermeasure.

16. The method of claim 15, further comprising:
communicating at least one of elevation, velocity, flight pattern, spin rate, control surfaces, cross-section, and size of the object to the processor;
determining, via the processor, a threat cue representative of an object type according to the at least one of the elevation, velocity, flight pattern, spin rate, control surfaces, cross-section, and size of the object;
determining, via the processor, a chosen countermeasure to be deployed according to the object type and position of the object;
evaluating the countermeasure for effectiveness via the confirmation device; and
deploying a different second countermeasure if the countermeasure is determined to be ineffective.

17. The method of claim 15, wherein the signal is a confirmation signal generated for a period of time in a range from about 10 ms to about 100 ms.

18. The method of claim 15, further comprising:
generating the signal in one of (i) a Ku Band ranging from about 12 GHz to about 18 GHz and (ii) a Ka Band ranging from about 26 GHz to about 40 GHz.

19. The method of claim 15, further comprising:
directing or instructing the confirmation device to cease radiation emission in response to a determination that the object has been defeated.

20. A soft-kill countermeasure assembly comprising:
a housing having a top end and a bottom end, wherein the top end is above the bottom end;
a gimbal coupled to the housing;
a gimbal head coupled to the gimbal to rotate 360° about a central axis that extends centrally through the gimbal, the gimbal head included an upwardly facing top surface defining a first surface area;
a confirmation device mounted to the gimbal head, wherein the confirmation device rotates in unison with the gimbal head, and the confirmation device includes a downwardly facing bottom surface defining a second surface area, and the second surface area is less than or equal to the first surface area; and
beam optics in the gimbal head that rotate in unison with the gimbal head.

* * * * *